(12) United States Patent
James

(10) Patent No.: US 7,354,298 B2
(45) Date of Patent: Apr. 8, 2008

(54) STRUCTURED CABLING SYSTEM AND PATCHING METHOD

(75) Inventor: Jason L. James, Northampton (GB)

(73) Assignee: Hellermanntyton Data Limited, Northampton (GB)

( * ) Notice: Subject to any disclaimer, the term of this patent is extended or adjusted under 35 U.S.C. 154(b) by 0 days.

(21) Appl. No.: 10/573,459

(22) PCT Filed: Sep. 27, 2004

(86) PCT No.: PCT/GB2004/004084

§ 371 (c)(1),
(2), (4) Date: Mar. 24, 2006

(87) PCT Pub. No.: WO2005/032162

PCT Pub. Date: Apr. 7, 2005

(65) Prior Publication Data

US 2007/0054527 A1 Mar. 8, 2007

(30) Foreign Application Priority Data

Sep. 26, 2003 (GB) ................................. 0322617.2

(51) Int. Cl.
*H01R 3/00* (2006.01)
(52) U.S. Cl. .................................... 439/490; 439/540.1
(58) Field of Classification Search ................ 439/490, 439/540.1, 489; 379/326, 320
See application file for complete search history.

(56) References Cited

U.S. PATENT DOCUMENTS

| | | | |
|---|---|---|---|
| 4,924,213 A | 5/1990 | Decho et al. | |
| 4,978,317 A | 12/1990 | Pocrass | |
| 5,418,334 A | 5/1995 | Williams | |
| 5,876,240 A | 3/1999 | Derstine et al. | |
| 6,234,830 B1 * | 5/2001 | Ensz et al. | ................... 439/491 |
| 6,285,293 B1 * | 9/2001 | German et al. | ............. 340/687 |
| 6,330,307 B1 * | 12/2001 | Bloch et al. | ................... 379/25 |
| 6,350,148 B1 * | 2/2002 | Bartolutti et al. | ........... 439/489 |
| 6,499,861 B1 * | 12/2002 | German et al. | ............. 362/253 |
| 6,688,910 B1 * | 2/2004 | Macauley | ................... 439/491 |
| 6,750,643 B2 * | 6/2004 | Hwang et al. | ................. 324/66 |
| 6,900,629 B2 * | 5/2005 | Hwang et al. | ........... 324/158.1 |
| 2003/0073343 A1 | 4/2003 | Belesimo | |
| 2006/0094291 A1 * | 5/2006 | Caveney et al. | ......... 439/540.1 |

\* cited by examiner

*Primary Examiner*—Hae Moon Hyeon
(74) *Attorney, Agent, or Firm*—Dykema Gossett PLLc

(57) ABSTRACT

A structured cabling system has two patch panels each having a plurality of jacks. Adjacent each jack is a Light-Emitting Diode (LED) which can be illuminated in response to a signal from a processor to identify the associated jack. The processor illuminates each LED in a sequence to identify the connections which should be made between the jacks, so that a first LED is illuminated, and once, the presence of a plug of a patch cable within the associated jack is detected, that LED is deactivated and a second LED is illuminated to identify the jack to which the plug on the other end of the patch cable should be connected. Once the presence of the plug in the second jack is detected, a continuity check is carried out between the two jacks before moving on to the next jack.

21 Claims, 8 Drawing Sheets

STRUCTURED CABLING SYSTEM AND PATCHING METHOD

BACKGROUND OF THE INVENTION

1. Field of Invention

This invention relates to a structured cabling system and to a method of patching a structured cabling system.

2. The Prior Art

Structured cabling systems enjoy extremely wide use for the purposes of providing data and voice services cabling within a commercial environment. Typically, a structured cabling installation comprises a plurality of rack mounted patch panels. Some of these patch panels will have cables connected to the individual jacks thereof leading to remote jacks at various locations around a building. Others of the patch panel will be connected to other fixed installations, for example a telephone switch system. Once all the fixed cabling has been installed patch leads are used to connect the jacks of respective patch panels to establish connections therebetween.

Heretofore, the patching process has been slow and even if carried out with care by skilled staff has been prone to error. In a large installation with many patch panels it can be difficult to see exactly which jack needs to be connected to which other jack. Further, the patching information (that is the instructions as to which jack is to be connected to which other jack) have to be read by the operator either from a hard copy print or a computer as he makes each connection. This is time-consuming and prone to error.

We have now devised a new structured cabling arrangement and associated patching method which substantially eliminates the possibility of error and greatly speeds up the patching process. The method of the present invention is applicable both to patching of new installations and to the re-patching of existing installations, for example as a result of relocation of different departments within an office building.

SUMMARY OF THE INVENTION

In accordance with the first aspect of the present invention there is provided a structured cabling system comprising a plurality of patch panels each having a plurality of jacks; an indicator device associated with each jack, each indicator device being operable by an applied electrical signal to provide a visual indication of its associated jack; and sensor means associated with each jack to provide an electrical indication of the presence or absence of a plug connected to the jack.

The present invention still further provides a jack for a structured cabling system which includes a body having a plurality of contacts therein and two partial shielding cans which are electrically isolated from each other, these cans, in use, being engaged by at least one contact formed on a plug which mates with the body in order to effect an electrical connection between the cans.

The present invention still further provides a jack for a structured cabling system according to any of claims 1 to 12, comprising a body having a plurality of contacts therein and two partial shielding cans which are electrically isolated from each other, said cans, in use, being engaged by at least one contact formed on a plug which mates with said body in order to effect an electrical connection between said cans.

In use of the present system, details of the required patching are set up on a central processing unit, for example a laptop computer or a server, and the central processing unit guides the installer in his patching activities. Typically, when the system is initiated to commence patching it will identify the first jack to which a patch lead is to be connected and will activate the indicator associated with that jack to provide a visual indication of the jack in question. The indicator can conveniently be a light source, for example a light emitting diode. Upon seeing the light the operator will insert the plug at one end of the patch lead into the identified socket. The insertion of the plug will be identified by the central processing unit which will then deactivate the indicator associated with the first jack socket and activate an indicator associated with the jack to which the other end of the first patch lead is to be connected. Insertion of the jack at the other end of the patch lead will be detected by the central processing unit. Alternatively, the indicators associated with the two jacks can be activated simultaneously and then simultaneously deactivated once a plug is detected in each or each separated deactivated when a plug is detected therein.

In a particularly preferred embodiment of the invention, the patch lead will include a continuity conductor so that correct patching can be validated by establishing a current path from the first jack to the second jack via the patch lead. This validation can conveniently be carried out by the central processing unit. Once the first patch has been completed in this manner the central processing unit will illuminate another jack and the operator will plug the first end of a second patch lead into the indicated jack. The process is repeated until the patching is complete.

It will be appreciated that the above described system means that patching can be carried out rapidly and by unskilled staff. The possibility for wrong patching is, in effect, eliminated because the system will not move onto the next patching operation until the last patching operation has been satisfactorily completed and validated.

In a particularly preferred embodiment of the invention the means for indicating the presence or absence of a jack comprises the establishment, by a contact on the plug, of a connection between two contacts provided associated with the jack. The contacts may, for example, be in the form of a split can which surrounds the jack The two parts of the can are connected to an appropriate detector circuit so that when the two parts of the can are electrically connected by the plug an electrical signal indicating the presence of the jack is provided.

In a particularly preferred embodiment of the invention means are provided for creating a record of the insertion and/or removal of a plug from a jack. The record may, for example, be established on the computer which carries the patching data. Typically, when a plug is inserted into an indicated jack, the fact of correct insertion will be noted on a database. Similarly, when the other end of a patch cord is inserted into an indicated jack, a record of this insertion will be created. If a continuity check is provided within the system, the results of the continuity check will likewise be recorded on the database. Preferably, means are provided for validating the records maintained by the database relative to the original patching instructions to provide confirmation that the patching has been correctly carried out.

The system preferably may also be used to facilitate re-patching. In this mode, if a modified patching arrangement is to be established a first jack will be indicated to show which plug should be removed. A second jack can then be indicated to show the new location of that plug. Preferably, a database record and validation system for the re-patching will be established.

The invention will be better understood from the following description of a preferred embodiment thereof, given by way of example only, reference being had to the accompanying drawings.

BRIEF DESCRIPTION OF THE DRAWINGS

FIG. 3b is an enlarged portion of a plug for use in the jack socket of FIG. 3a;

FIG. 3c is an illustration of the plug of FIG. 3b inserted into the jack of FIG. 3a;

DISCUSSION

Figure 1:
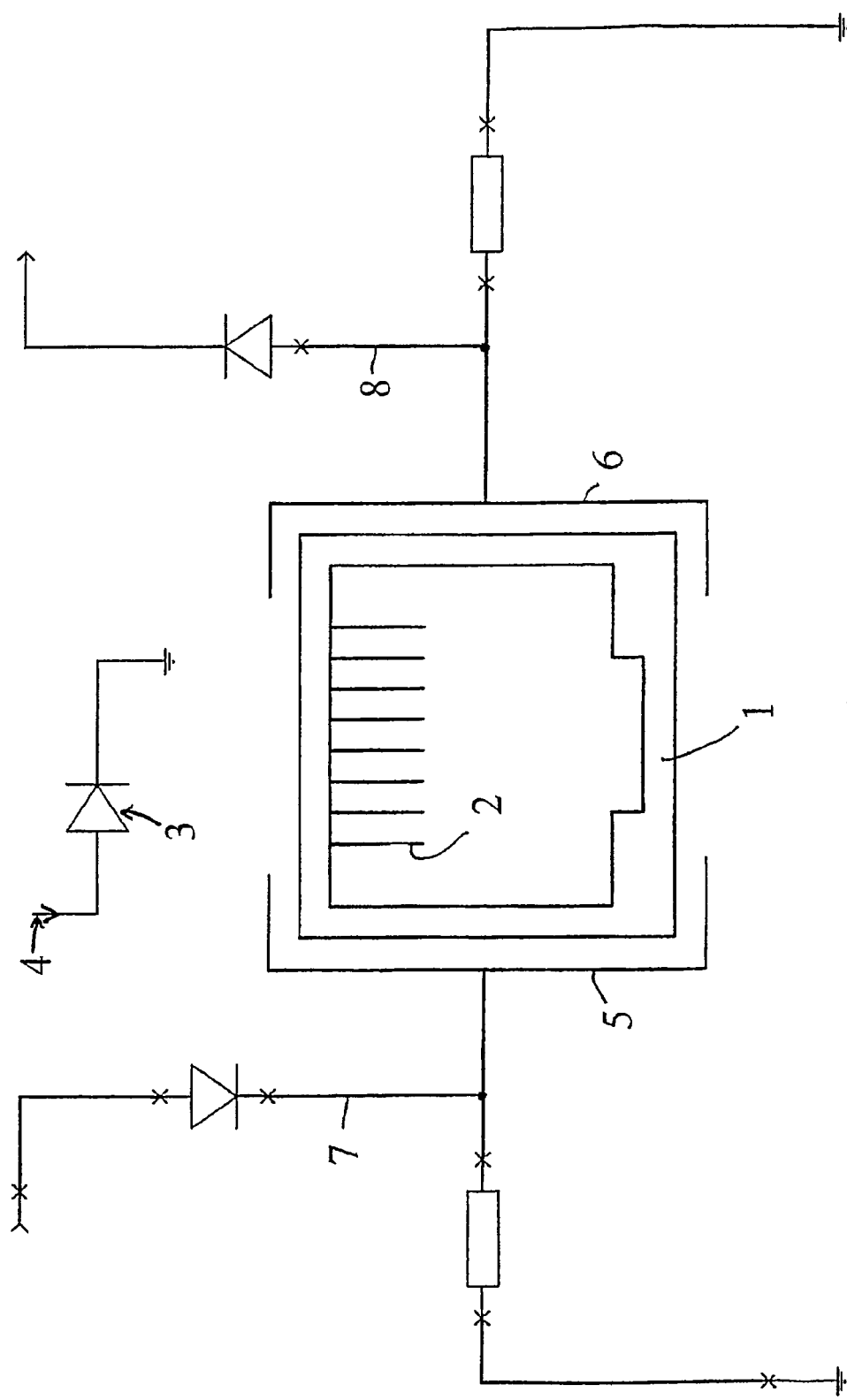
FIG. 1 is a schematic illustration of a single lack of a structured cabling system according to the invention.

FIG. 1 illustrates schematically a single jack (also called jack socket) of a structured cabling system. It will be appreciated that, in practice, many identical jacks will be present in such a system. For simplicity, all jacks of the system should preferably be in the form of the single jack illustrated in the drawing.

The jack comprises a conventional body 1 and contacts 2 in accordance with the RJ45 protocol. Adjacent the jack is provided a Light-Emitting Diode (LED) 3 which can be illuminated in response to a signal 4 provided by a central processing unit. The LED 3 is immediately adjacent the jack 1 so that when the LED is illuminated it identifies uniquely the jack to which it is adjacent.

The jack 1 is provided with two partial shielding cans 5, 6 which, when no plug is present in the jack, are electrically isolated from each other. The two separate parts 5, 6 are connected by suitable cabling 7, 8 to a central processing unit.

Figure 2:
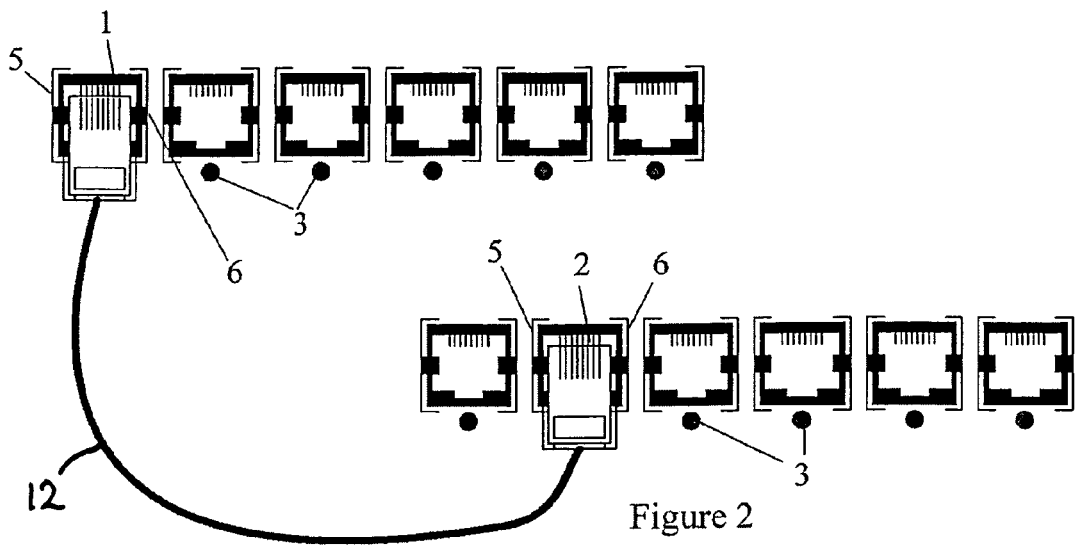
FIG. 2 is a schematic illustration of a pair of patch panels incorporating the cabling system of the invention with a patch cable connected therebetween.
Figure 3A:
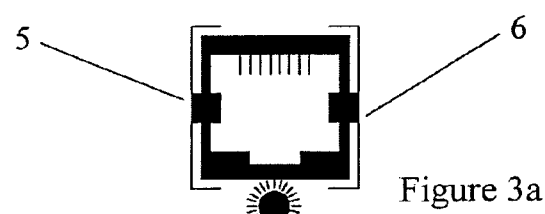
FIG. 3a is an enlarged illustration of a jack socket embodying the invention.
Figure 3B:
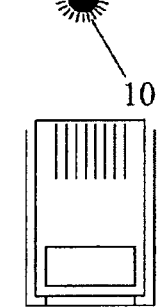
Figure 3C:
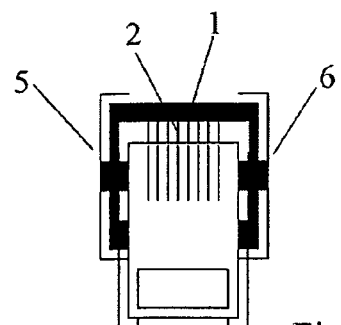
Figure 4:
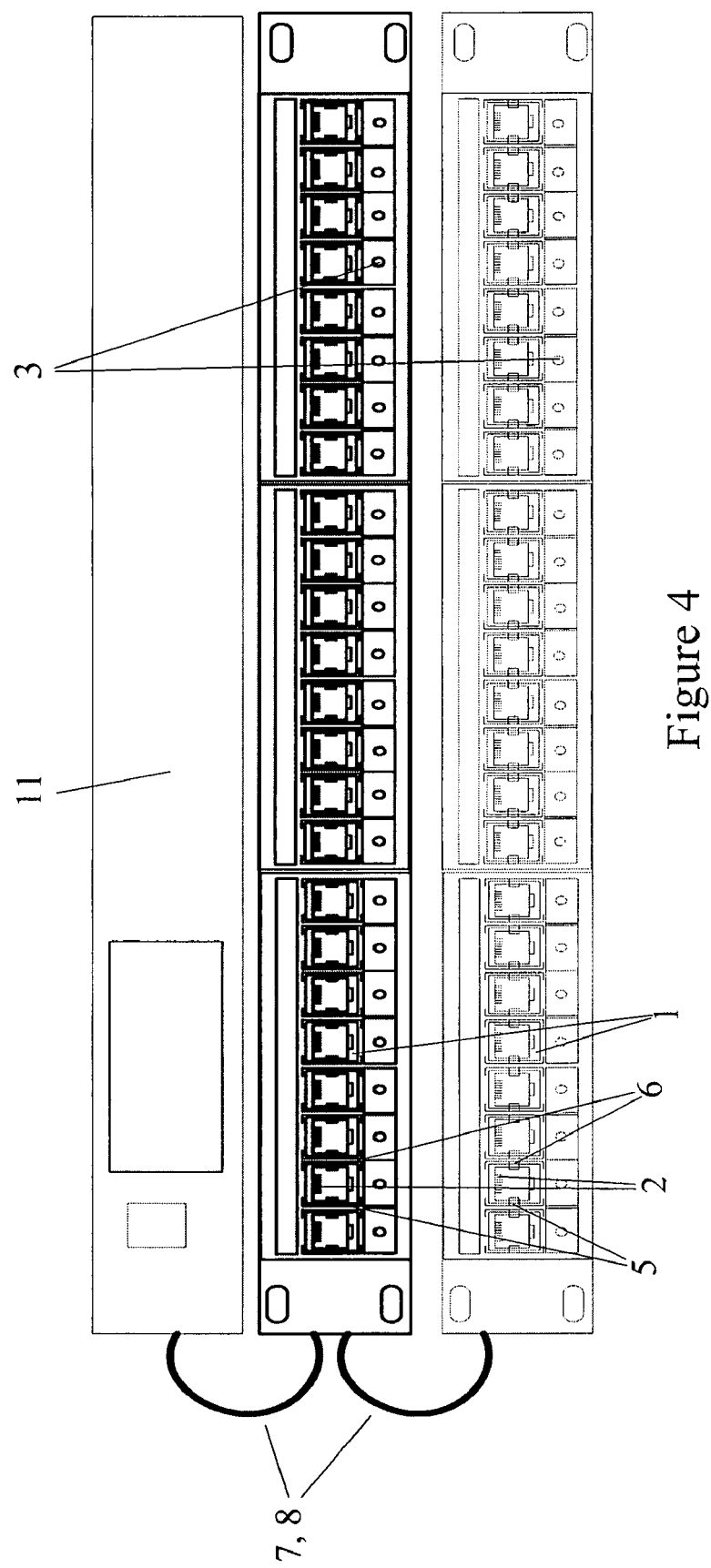
FIG. 4 is an illustration of a pair of patch panels each incorporating sockets according to the invention connected to a controller.
Figure 5:
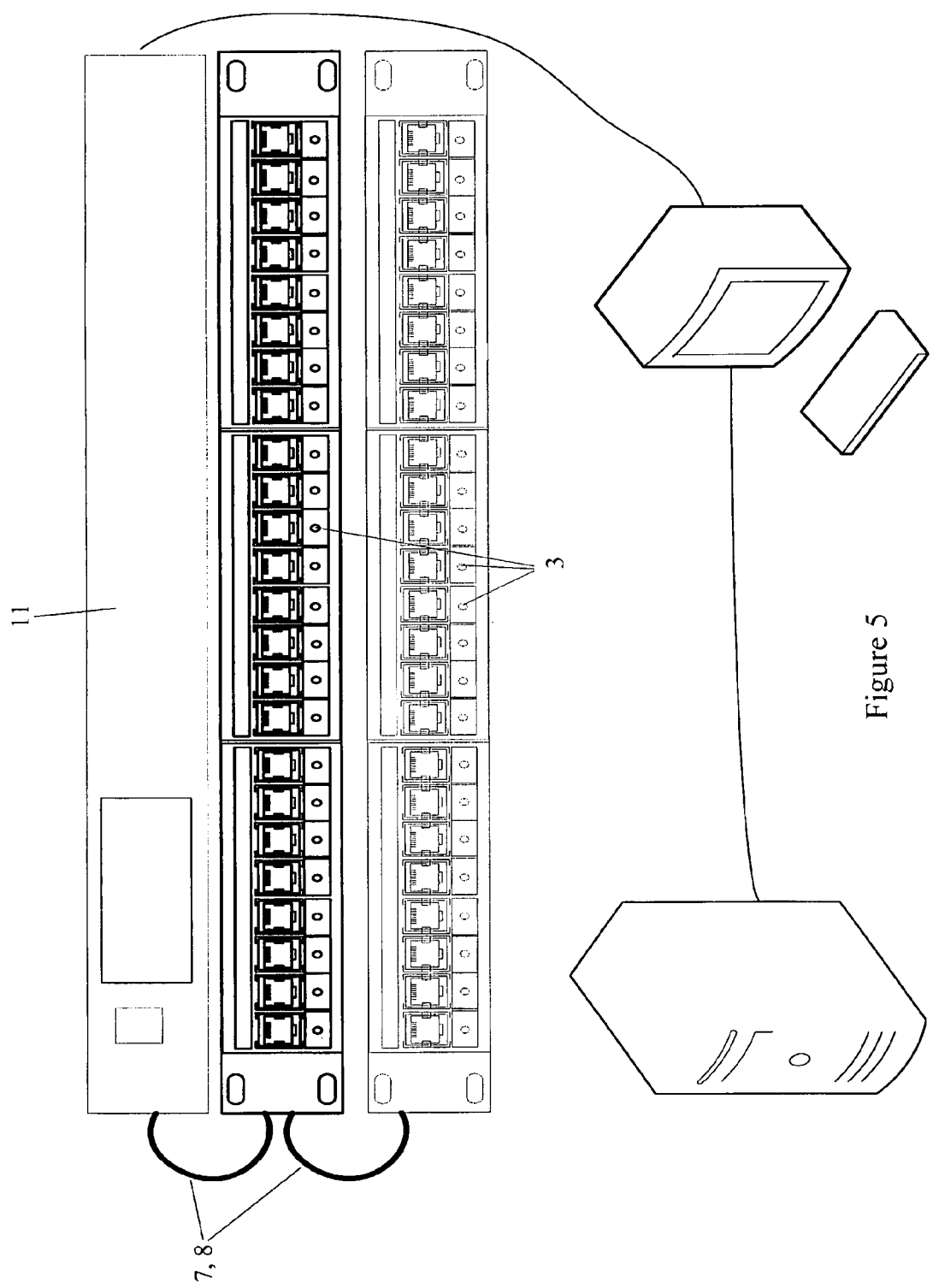
FIG. 5 is an illustration of the system of FIG. 4 connected to a computer interface for uploading and downloading data to the controller.
Figure 6:
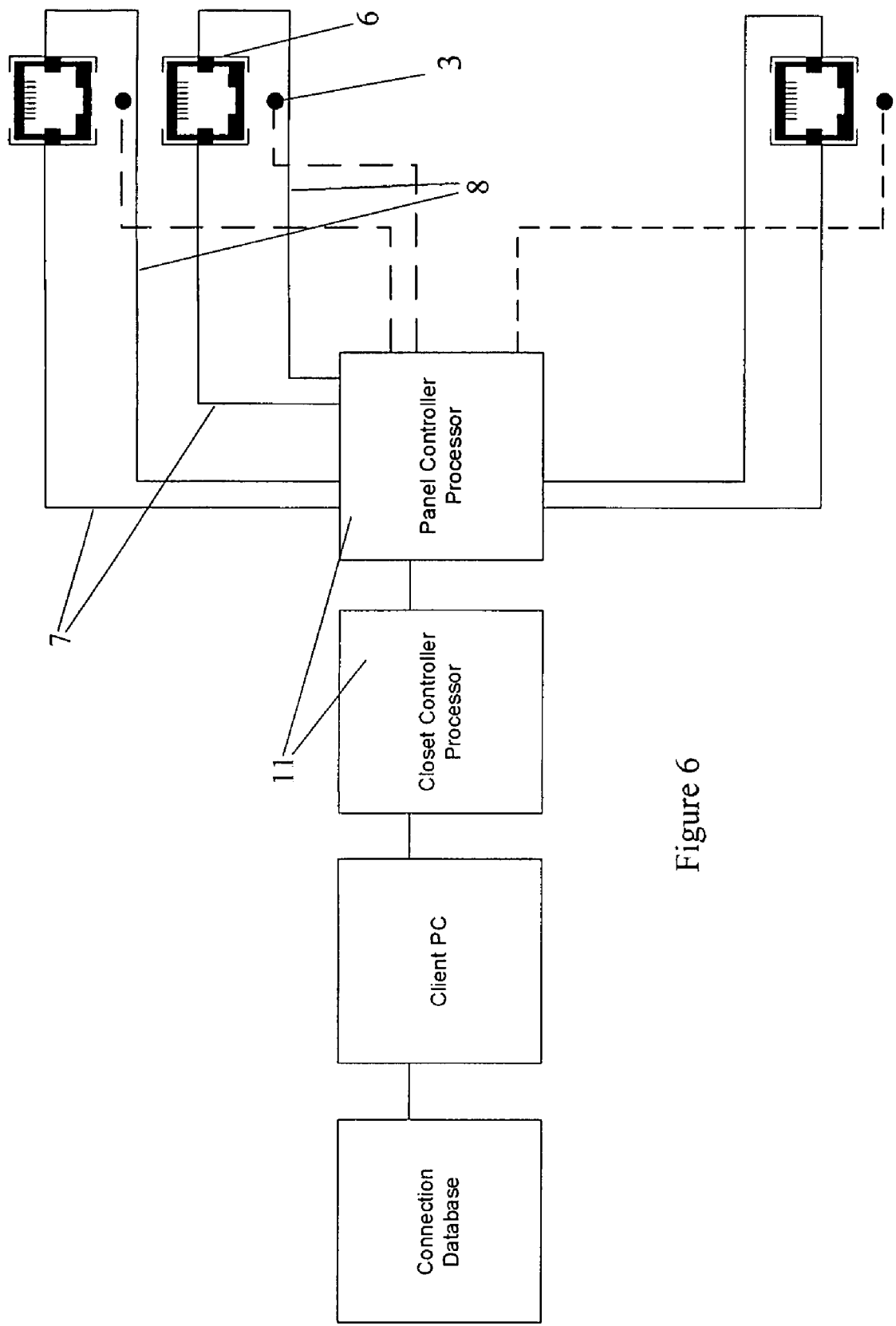
FIG. 6 is a schematic illustration of the controller system underlying the invention.

FIG. 2 shows two patch panels of the invention with a patch cable (lead) 12 extending therebetween; FIGS. 3a, 3b, 3c respectively show a jacket socket, plug and plug positioned in a jack of the invention; FIG. 4 shows two patch panels with sockets according to the invention connected to a controller, FIG. 5 shows the system of FIG. 4 connected to a computer, and FIG. 6 illustrates the controller system.

Figure 7:
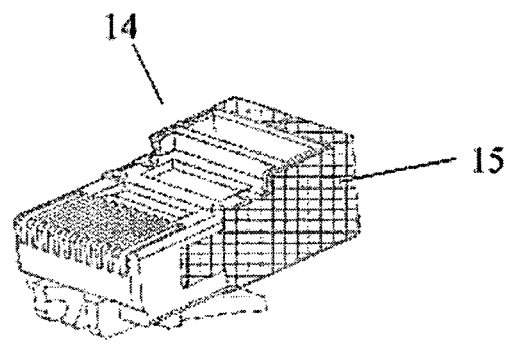
FIG. 7 is a perspective view of a jack plug having a metal can for bridging contacts in a patch port of FIG. 2.
Figure 8A:
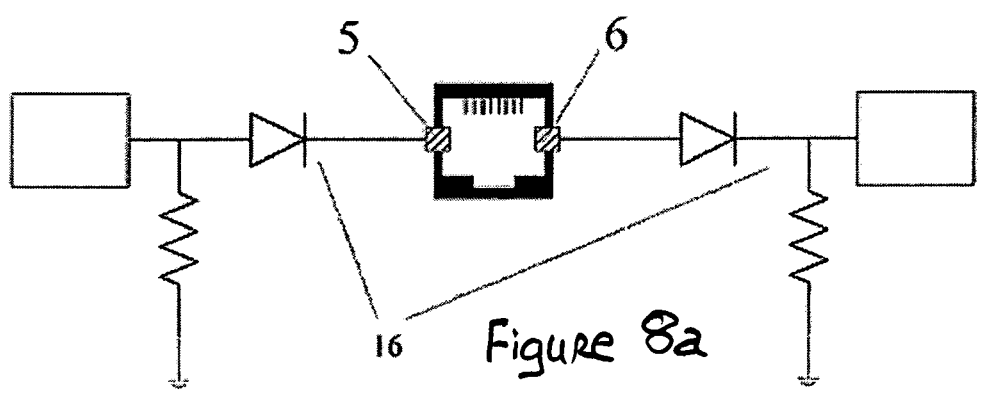
FIGS. 8a and 8b are diagrammatic illustrations of patch ports showing continuity detection circuitry for respective jack plugs at opposite ends of a patch cable.
Figure 8B:
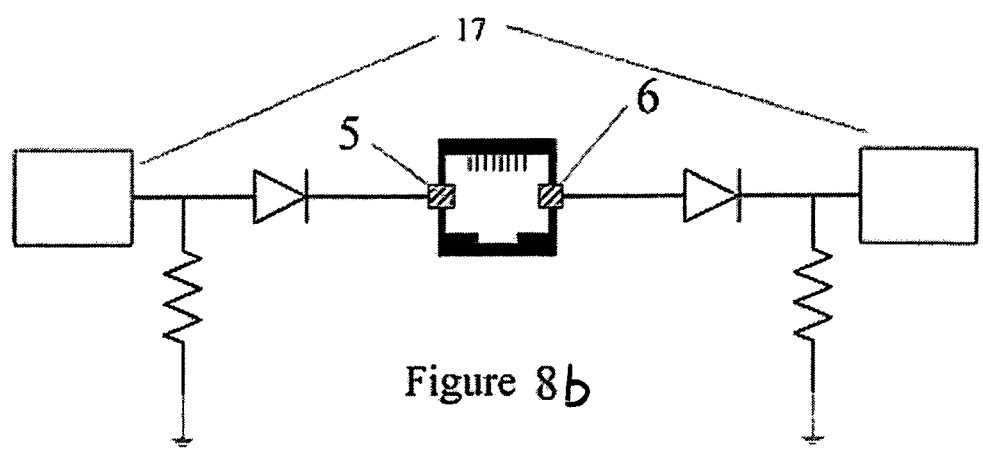
Figure 9:
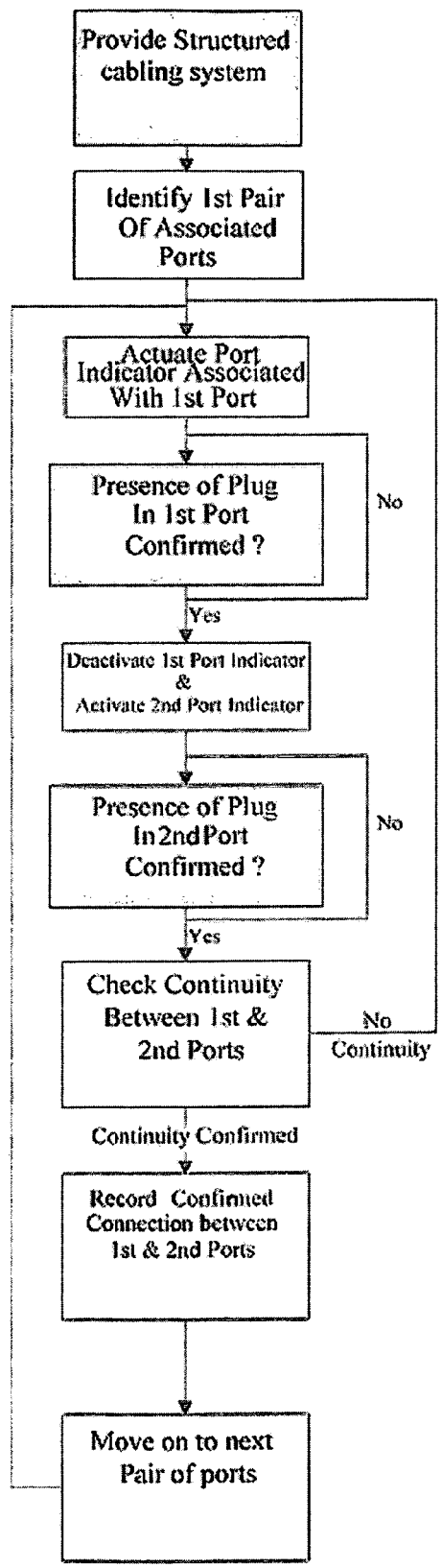
FIG. 9 is a flow chart of the method steps according to the first embodiment of the invention.
Figure 10:
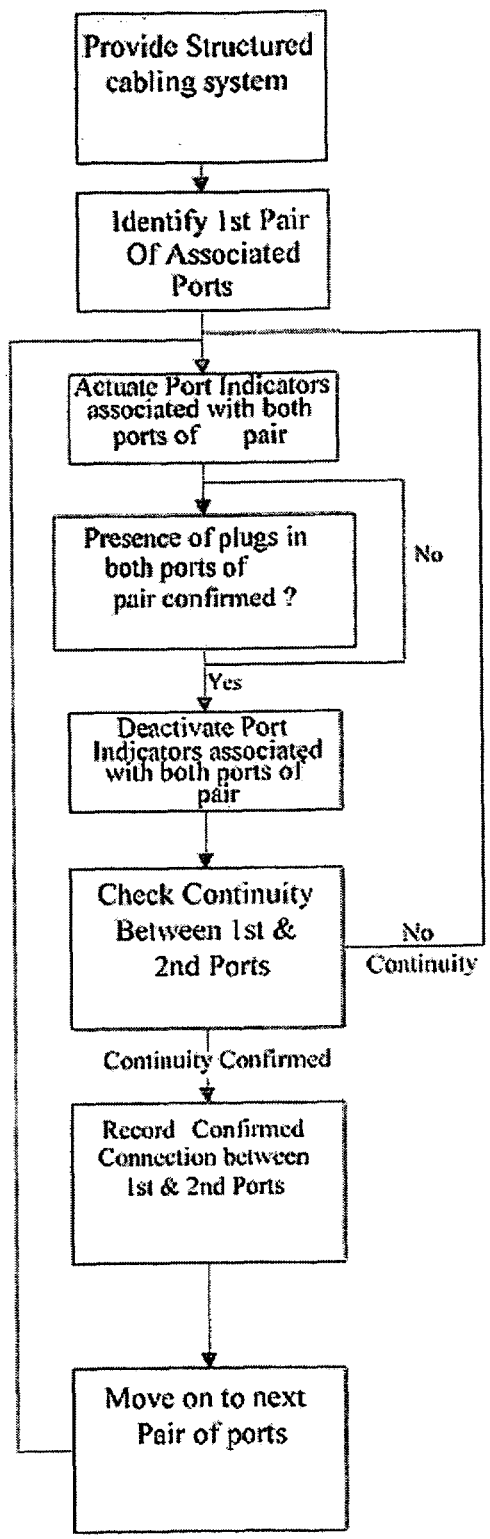
FIG. 10 is a flow chart of the method steps according to the second embodiment of the invention.

FIG. 7 shows a perspective view of a jack plug 14 and a bridge contact 15. An electrical circuit is completed when the bridge contact of the jack plug is connected to two contacts at the sensor means in the jack socket. FIGS. 8a and 8b show electrical circuits connected to the two patch sockets to be connected by jack plugs at opposite ends of a patch cable, a detector circuit 16 being shown for one jack socket and a detector circuit 17 being shown for the other jack socket. These detector circuits, combined with the controller (see FIG. 4) to which they are connected, provide continuity checking means.

Patching of a installation comprising a multiplicity of the jacks in the drawing is accomplished as outlined above.

The invention claimed is:

1. A structured cabling system comprising first and second patch panels each having a plurality of jacks, an indicator means associated with each jack, each said indicator means being operable by an applied signal to provide a signal which identifies the jack associated with that indicator means, and at least two contacts provided in each jack which, in use, are bridged by a contact provided on a plug when the plug is connected to the jack so as to complete an electrical circuit associated with the indicator means, thereby providing an electrical indication of the presence or absence of the plug connected to the jack.

2. A structured cabling system according to claim 1, wherein each jack has a split can having two parts which are electrically isolated from each other, the contact provided on the plug electrically contacting said two parts upon insertion of the plug into a jack so as to electrically connect said two parts and thereby complete a detector circuit connected to said two parts of the spit can.

3. A structured cabling system according to claim 1, wherein said indicator means provides a visual signal which identifies the jack associated therewith.

4. A structured cabling system according to claim 3, wherein the indicator means is a light source.

5. A structured cabling system according to claim 4, wherein said light source is a light-emitting diode.

6. A structured cabling system according to claim 1, further including continuity checking means associated with each jack, which, in use, operates to confirm full connection between a jack in the first patch panel and its associated jack in the second patch panel.

7. A structured cabling system according to claim 1, further including processor means operable to provide an applied signal to said indicator means in a sequence so as to identify a patching sequence for effecting connections between the first and second patch panels.

8. A structured cabling system according to claim 7, wherein said processor means actuates said indicator means in a sequence which identifies pairs of jacks into which, in use, opposing ends of a patch lead should be connected.

9. A structured cabling system according to claim 7, wherein said processor means actuates indicator means alternately on said first patch panel and said second patch panel so as to identify, in sequence, a jack on the first patch panel followed by its associated jack on the second patch panel.

10. A structured cabling system according to claim 7, wherein said indicator means are operable only one at a time, and said processor means is connected to said sensor means, each said indicator means being operated until said sensor means of the associated jack is triggered, at which time the next indicator means in the sequence is operated.

11. A method of providing connection between a plurality of jacks provided on at least two patch panels, comprising the steps of providing a structured cabling system as defined in claim 1, and actuating each indicator means in a sequence which identifies pairs of jacks into which the two ends of a patch lead are to be connected in order to effect a connection between said first and second jacks.

12. A method according to claim 11, wherein said indicator means are actuated to identify one pair of jacks at a time.

13. A method according to claim 11, wherein said indicator means are actuated one at a time so as to identify a single jack at a time, the indicator means of pair jacks being actuated one after the other.

14. A method according to claim 11, comprising the further step of detecting the presence or absence of plug collected to each jack.

15. A method according to claim 14, comprising the further step of creating a record of the insertion and/or removal of a plug from a jack.

16. A method according to claim 14, comprising the further step of carrying out a continuity check between each pair of jacks when a plug has been detected as being connected to each jack of the pair.

17. A method according to claim 16, comprising the further step of creating a record of the results of the continuity checks carried out on the pairs of jacks.

18. A method according to claim 11, comprising the further step of programming processor means with an actuation sequence for the indicator means, connecting the processor means to the structured cabling system, and operating said processor means to run said sequence.

19. A method according to claim 18, comprising the further step of using said processor means to create the or each record and validating the or each record with the actuation sequence of the processor means to confirm the patching operation has been carried out correctly.

20. A method according to claim 11, wherein each said indicator means can be actuated to indicate that a plug connected to a jack should be removed.

21. A jack for a structured cabling system according to claim 1, comprising a body having a first plurality of contacts therein which, in use, connect with contacts on a mating plug for transferring data to a cable attached to said plug, and at least two further contacts which are electrically isolated from each other, said at least two further contacts, in use, being engaged by at least one bridging contact formed on the mating plug in order to effect an electrical connection between said two contacts, the jack, in use, having an indicator means associated therewith.

* * * * *